United States Patent
Shen et al.

(10) Patent No.: US 9,215,110 B2
(45) Date of Patent: Dec. 15, 2015

(54) HITLESS EFFICIENT TRANSMITTER PROTECTION OF ALL OUTDOOR RADIOS

(75) Inventors: Ying Shen, Chapel Hill, NC (US); Andrey Kochetkov, Cary, NC (US)

(73) Assignee: ZTE (USA) INC., Austin, TX (US)

( * ) Notice: Subject to any disclaimer, the term of this patent is extended or adjusted under 35 U.S.C. 154(b) by 2 days.

(21) Appl. No.: 14/342,924

(22) PCT Filed: Sep. 10, 2012

(86) PCT No.: PCT/US2012/054472
§ 371 (c)(1),
(2), (4) Date: Mar. 5, 2014

(87) PCT Pub. No.: WO2013/039837
PCT Pub. Date: Mar. 21, 2013

(65) Prior Publication Data
US 2014/0241480 A1 Aug. 28, 2014

Related U.S. Application Data

(60) Provisional application No. 61/533,710, filed on Sep. 12, 2011.

(51) Int. Cl.
*H04B 1/38* (2015.01)
*H04L 25/03* (2006.01)
(Continued)

(52) U.S. Cl.
CPC ............ *H04L 25/03821* (2013.01); *H04B 1/74* (2013.01); *H04L 7/0016* (2013.01); *H04L 7/02* (2013.01); *H04L 27/0014* (2013.01); *H04B 1/0483* (2013.01); *H04L 2027/0022* (2013.01);

(Continued)

(58) Field of Classification Search
USPC ................. 375/219, 220, 373, 364, 356, 362; 455/502, 208, 265, 13.3, 129
See application file for complete search history.

(56) References Cited

U.S. PATENT DOCUMENTS 4,188,582 A 2/1980 Cannalte et al.
7,394,870 B2 * 7/2008 Chien et al. .................... 375/316
(Continued)

FOREIGN PATENT DOCUMENTS

EP 0986231 A1 3/2000
EP 1467507 A2 10/2004

OTHER PUBLICATIONS

ZTE (USA) Inc., International Search Report and Written Opinion, PCT/US2012/054472, Jan. 23, 2013, 8 pgs.
(Continued)

*Primary Examiner* — Dominic E Rego
(74) *Attorney, Agent, or Firm* — Morgan, Lewis & Bockius LLP (57) ABSTRACT

A method is provided for synchronizing a first radio unit with a second radio unit associated with an all outdoor radios system, the method including: receiving, at the first radio unit and the second radio unit, respectively, a communication signal from a common communication source; receiving, at the first radio unit and the second radio unit, respectively, a reference signal from a common reference source; synchronizing the communication signal at each of the first radio unit and the second radio unit with the reference signal such that the each of the first radio unit and the second radio unit generates an output signal having substantially the same frequency and substantially the same phase; and transmitting the output signal from each of the first radio unit and the second radio unit to a remote receiver through an antenna.

10 Claims, 9 Drawing Sheets

(51) Int. Cl.
*H04L 7/02* (2006.01)
*H04B 1/74* (2006.01)
*H04L 27/00* (2006.01)
*H04L 7/00* (2006.01)
*H04B 1/04* (2006.01)

(52) U.S. Cl.
CPC . *H04L 2027/0067* (2013.01); *H04L 2027/0087* (2013.01)

(56) References Cited

U.S. PATENT DOCUMENTS

| | | | |
|---|---|---|---|
| 8,674,808 B2* | 3/2014 | Jantunen et al. | 340/10.3 |
| 2007/0071078 A1* | 3/2007 | Yoshida et al. | 375/219 |
| 2008/0181174 A1* | 7/2008 | Cho | 370/329 |
| 2009/0186585 A1 | 7/2009 | Ahrony et al. | |
| 2009/0203309 A1* | 8/2009 | Okuda | 455/7 |
| 2012/0188125 A1* | 7/2012 | Pomietlasz | 342/357.68 |

OTHER PUBLICATIONS

Zhou, Adaptive Correction Method for an OCXO and Investigation of Analytical Cumulative Time Error Upper Bound, IEEE Transactions on Ultrasonics, Ferroelectrics, and Frequency Control, vol. 58, No. 1, Jan. 2011, 8 pgs.

ZTE (USA) Inc., Communication Pursuant to Rules 70(2) and 70a(2) EPC, EP 12831502.5, May 12, 2015, 1 pg.

ZTE (USA) Inc., Extended European Search Report, EP 12831502.5, Apr. 24, 2015, 9 pgs.

* cited by examiner

HITLESS EFFICIENT TRANSMITTER PROTECTION OF ALL OUTDOOR RADIOS

CROSS REFERENCE TO RELATED APPLICATIONS

This Application is a United States National Stage Application filed under 35 U.S.C. §371 of PCT Patent Application Serial No. PCT/US2012/054472 filed on Sep. 10, 2012, which claims the benefit of and priority to U.S. Provisional Patent Application No. 61/533,710 filed on Sep. 12, 2011, which are hereby incorporated by reference in their entireties.

FIELD OF INVENTION

The present invention relates generally to the field of telecommunication networks and, in particular, to the field of hitless efficient transmitter protection of all outdoor radios.

BACKGROUND

Figure 1:
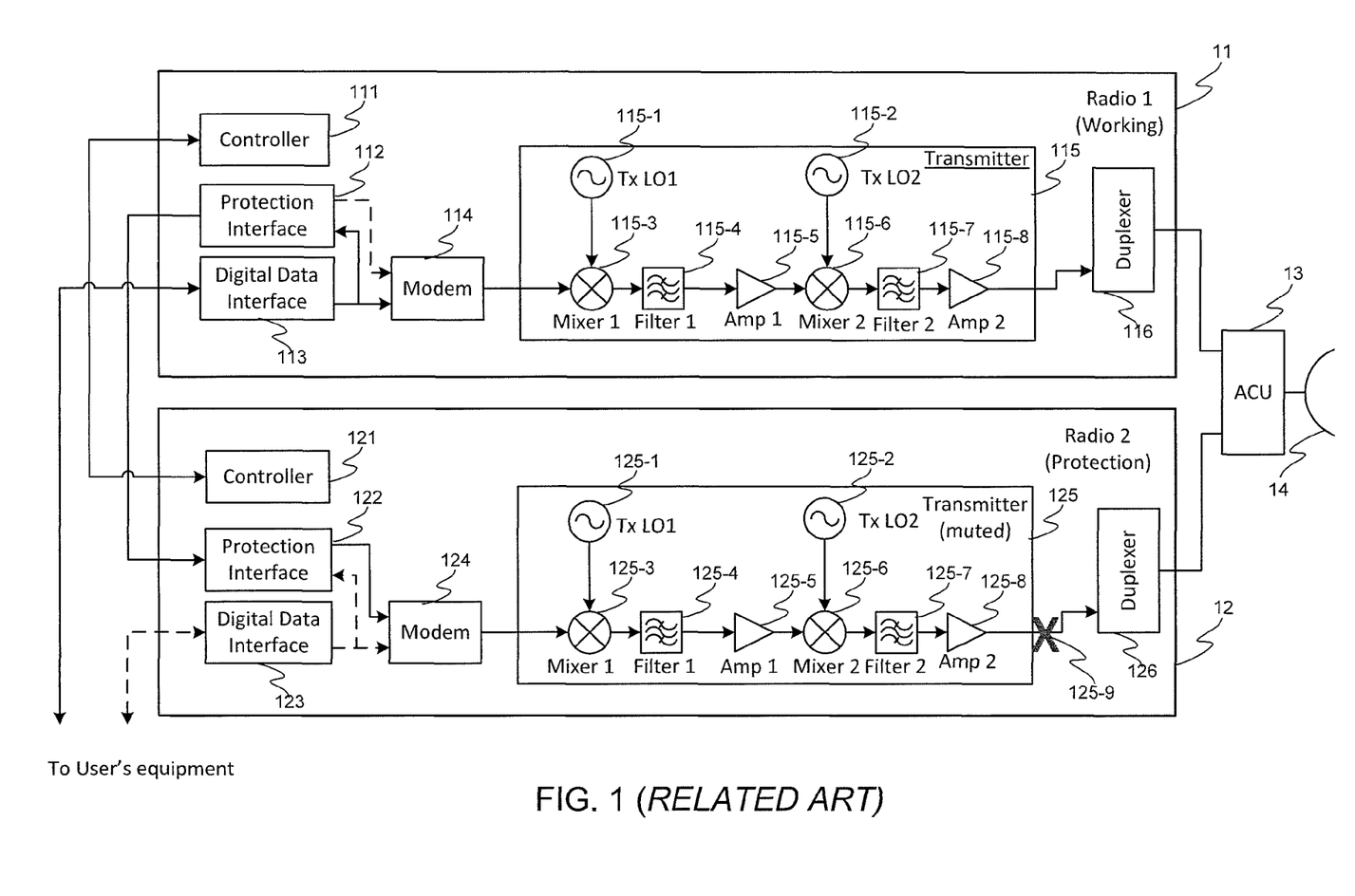
FIG. 1 is an exemplary illustration of a prior art all outdoor radios system including a working unit and a protection unit that are both coupled to one antenna through an antenna coupling unit.
Figure 2:
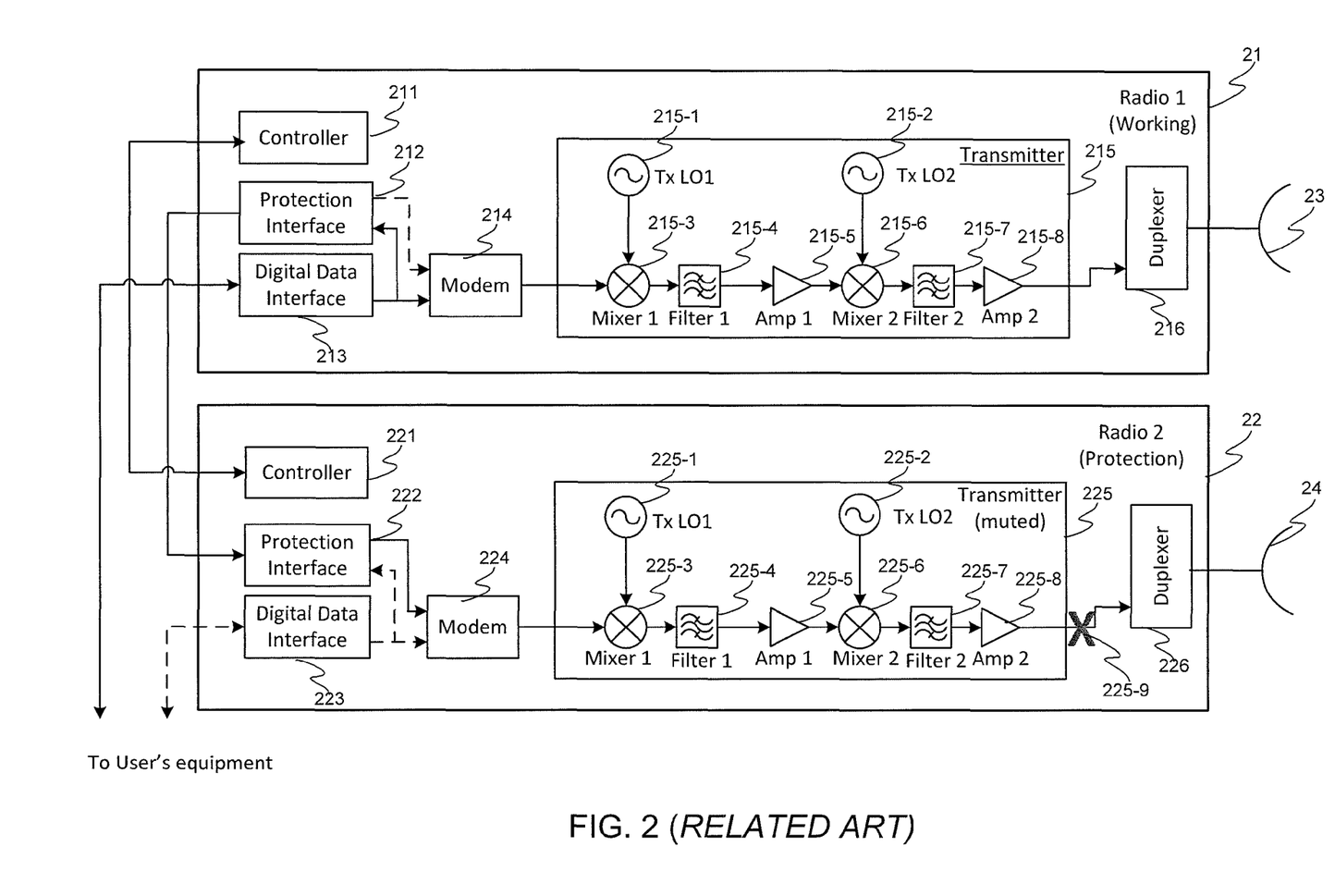
FIG. 2 is an exemplary illustration of a prior art all outdoor radios system including a working unit and a protection unit, each coupled to a separate antenna.

In the typical radio backhaul networks as shown in FIGS. 1 and 2, two all outdoor radio units, a working unit (11 in FIG. 1 or 21 in FIG. 2) and a protection unit (12 in FIG. 1 or 22 in FIG. 2), are deployed in a (1+1) redundant configuration to protect against hardware failure, including transmitter module failure. Note that the working unit (11 or 21) and the protection unit (12 or 22) can be connected to the same antenna as shown in FIG. 1 or can use two separate antennas as shown in FIG. 2. The latter case has the added benefit of protecting against selective path fading in the receiving direction. For illustrative purposes, the two figures depict only components relevant to the transmitter module protection. In both cases, the customer data traffic is received by the digital data interface (113 or 213) in the working radio unit (11 or 21) and then transmitted to modems in both the working radio unit (11 or 21) and the protection radio unit (12 or 22). In other words, the working unit (11 or 21) is the unit that receives the customer data traffic directly from the user's equipment, and whose transmitter is online when there is no failure. The protection unit (12 or 22) does not receive the customer data traffic directly from the user's equipment. Instead, the protection unit (12 or 22) receives the customer data traffic from the working unit (11 or 21) via the protection interface (112 or 212) in the working unit (11 or 21), a cable interconnect between the two units, and the protection interface (122 or 222) in the protection unit (12 or 22). In case of a failure detected at the transmitter (115 or 215) in the working unit (11 or 21), which will be muted accordingly, the transmitter (125 or 225) in the protection unit (12 or 22) will be un-muted. When this happens, the protection unit (12 or 22) still receives the customer data traffic from the working unit (11 or 21) via the cable interconnect as described above.

Using the (1+1) redundant configuration in FIG. 1 as an example, although the output signal that carries the same data traffic is connected to both transmitters 115 and 125, only one of the two transmitters, either the transmitter 115 in the working radio unit 11 or the transmitter 125 in the protection unit 12, is online when there is no failure. The transmitter 125 in the protection radio unit 12 is muted (as indicated by the "X" symbol 125-9). When the radio control logic detects failure of the online transmitter 115 in the working radio unit 11, it mutes the failed transmitter 115 and un-mutes the transmitter 125 in the protection radio unit 12, so as to restore the customer data traffic flow. As such, each of the two participating units can be designated as a working unit or a protection unit. The dashed lines in FIGS. 1 and 2 represent the connections that are not carrying the customer data traffic at the moment, but may carry the customer data traffic if the definitions of the working and protection units are reversed.

Note that there are small but random frequency and phase offsets between a pair of working and protection radio units, which may cause incoherency between the two respective carrier signals. Therefore, it is necessary to mute one of the radio units in the pair. If both transmitters were online with the random frequency and phase offsets, the two carrier signals each would be a high level noise to the other and the receivers on the remote side of the radio link will not be able to recover the transmitted data correctly.

On the other hand, the switch from the working radio unit to the protection radio unit results in a traffic interruption. Currently, the industry-standard traffic interruption is less than 50 ms. But it is difficult to meet this requirement for all possible transmitter failures. It is even more difficult to meet this requirement in the all outdoor radio because of the additional time needed to communicate between the controllers in the pair of radio units. Moreover, because the protection radio unit is muted, half of the transmitting power according to the current transmitter protection scheme is not used at any given time.

SUMMARY

Accordingly, the present invention is directed to a system and method for implementing an efficient transmitter protection scheme in the all outdoor radios that substantially obviates one or more problems due to the limitations and disadvantages of the related art.

In an embodiment, a method is provided for synchronizing a first radio unit with a second radio unit associated with an all outdoor radios system, the method comprising: receiving, at the first radio unit and the second radio unit, a communication signal from a common communication source; receiving, at the first radio unit and the second radio unit, a reference signal from a common reference source; synchronizing the communication signal at each of the first radio unit and the second radio unit with the reference signal such that the each of the first radio unit and the second radio unit generates an output signal having substantially the same frequency and substantially the same phase; and transmitting the output signal from each of the first radio unit and the second radio unit to a remote receiver through an antenna.

In another embodiment, an all outdoor radios system comprises: an antenna coupling unit; a first radio unit and a second radio unit, wherein both the first radio unit and the second radio unit are communicatively coupled to the antenna coupling unit and each of the first radio unit and the second radio unit is configured to receive an input signal from a common communication source and provide an output signal to the antenna coupling unit; and a common reference source configured to generate a reference signal having a reference frequency and a reference phase, wherein each of the first radio unit and the second radio unit further comprises: a frequency synchronizer configured to synchronize the frequency of the input signal of the radio unit with the reference frequency of the reference signal; and a phase synchronizer configured to synchronize the phase of the input signal of the radio unit with the reference phase of the reference signal, such that the output signal of the first radio unit and the output signal of the second radio unit have substantially the same frequency and substantially the same phase when they reach the antenna coupling unit.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of all outdoor radios system that include two substantially identical radio units.

In the present application, two approaches are proposed for obviating the problems described above by synchronizing the carrier signals in the working radio unit and the protection radio unit such that both signals are combined and transmitted to the receiver on the remote side and no signal is muted. According to the present application, the coherent power combination scheme keeps the transmitters in both units of an all outdoor radios system online when there is no transmitter failure. The coherent power combination scheme not only increases the effective output power of the system, consisting of two radio units, by 6 dB, but also eliminates the customer data traffic interruption due to the failure of one transmitter within any one of the two radio units of the all outdoor radios system. In other words, a failure of any one of the two radio units only result in the reduction of output power by 6 dB without any traffic interruption time. A basic requirement for coherent power combination is that the transmitter output signals of the working and protection units within the all outdoor radios system must be synchronized by frequency and phase with a reference signal generated by a common signal source shared by the two radio units.

Figure 3A:
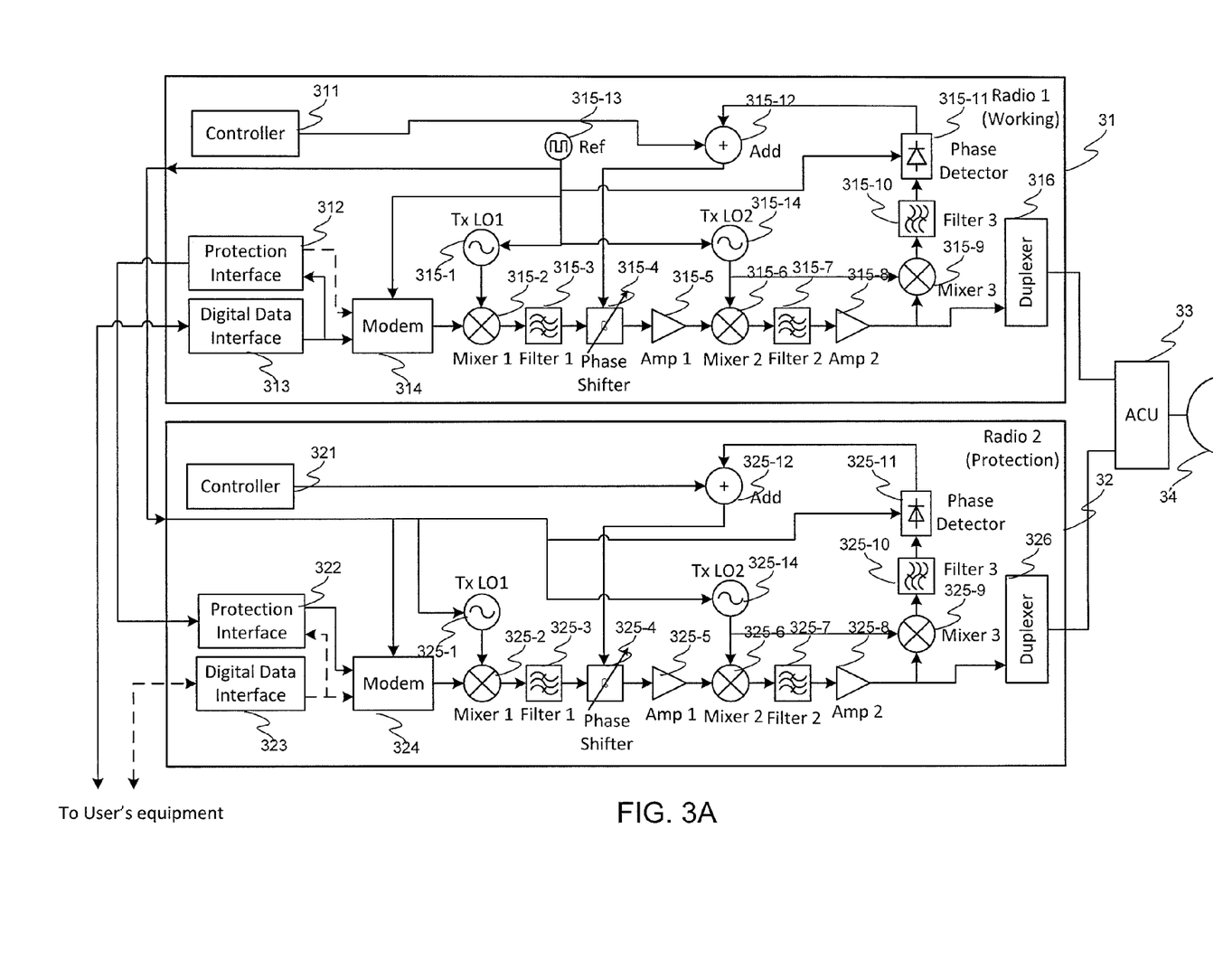
FIGS. 3A and 3B are exemplary illustrations of an all outdoor radios system including a common reference source for synchronizing the carrier signals between two radio units in accordance with some embodiments of the present invention.

FIG. 3A is an exemplary illustration of an all outdoor radios system including a common reference source for synchronizing the carrier signals between two radio units in accordance with some embodiments of the present invention.

The outdoor radios system includes an antenna coupling unit 33 that is coupled to an antenna 34 for transmitting signals to receivers at the remote side, a first radio unit 31 (i.e., the working radio unit), and a second radio unit 32 (i.e., the protection unit). Both the first radio unit 31 and the second radio unit 32 are communicatively coupled to the antenna coupling unit 33 and each of the first radio unit 31 and the second radio unit 32 is configured to receive an input signal from a common communication source (e.g., the user's equipment) and provide an output signal to the antenna coupling unit 33. In some embodiments, the first radio unit 31 includes a common reference source (e.g., the reference oscillator 315-13), which is configured to generate a reference signal having a reference frequency and a reference phase for synchronizing the carrier signals of the first and second radio units.

In some embodiments, each of the first radio unit 31 and the second radio unit 32 further comprises: (i) a frequency synchronizer configured to synchronize the frequency of the input signal of the radio unit with the reference frequency of the reference signal; and (ii) a phase synchronizer configured to synchronize the phase of the input signal of the radio unit with the reference phase of the reference signal, such that the output signal of the first radio unit 31 and the output signal of the second radio unit 32 have substantially the same frequency and substantially the same phase when they reach the antenna coupling unit 33.

As shown in FIG. 3A, the first radio unit 31 includes a protection interface 312 and a digital interface 313 for receiving the input signal from the user's equipment (note that there is no dashed line connecting to either the protection interface 312 or the digital interface 313). The input signal is then transmitted to a modem 314 for modulation. Next, the output signal of the modem 314 is transmitted to a first mixer 315-2 for being mixed with the output of an intermediate frequency synthesizer 315-1. As shown in FIG. 3A, the intermediate frequency synthesizer 315-1 is controlled by the reference signal from a common reference source 315-13 in the first radio unit 31. The output signal of the first mixer 315-2 is then fed into a first filter 315-3 and a phase shifter 315-4 connected in series. The phase shifter 315-4 applies a phase shift to the output signal of the first filter 315-3 in accordance with a phase-shift signal from an adder 315-12.

Next, the output signal of the phase shifter 315-4 is amplified at a first amplifier 315-5 and fed into a second mixer 315-6 for being mixed with the output signal of a radio frequency synthesizer 315-14. Note that the radio frequency synthesizer 315-14 is also controlled by the reference signal from the reference source 315-13. Finally, the output signal of the second mixer 315-6 is filtered by a second filter 315-7, amplified by a second amplifier 315-8, and fed to the ACU 33 through a duplexer 316 in the first radio unit 31.

In addition, the output signal of the second amplifier 315-8 is fed into a third mixer 315-9 for being mixed with the output signal of the radio frequency synthesizer 315-14, filtered by a third filter 315-10, and fed into a phase detector 315-11 for detecting a phase difference with the reference signal from the reference source 315-13. The phase detector 315-11 transmits the phase difference to the adder 315-12. As noted above, the adder 315-12 is configured to cause a corresponding phase shift to the input signal at the phase shifter 315-4 under the control of a controller 311 in the first radio unit 31.

As shown in FIG. 3A, the frequency synchronization is achieved by having the modems, the intermediate frequency (IF) synthesizers Tx LO1, and the radio frequency (RF) synthesizers Tx LO2 in both radio units share the common reference source in the working radio unit 31, which is a free running reference oscillator "Ref" 315-13. The reference oscillator 315-13 provides the reference frequency to the IF synthesizer Tx LO1 315-1, the RF synthesizer Tx LO2 315-14, and the reference clock to the modem 314 in the working radio unit 31.

In addition, the output of the reference oscillator 315-13 is also connected to the protection radio unit 32 using a cable such that the reference oscillator 315-13 acts as a reference for the IF synthesizer Tx LO1 325-1, the RF synthesizer Tx LO2 325-14, and the modem 324 in the protection radio unit 32. The output signals of the frequency synchronized modem (314, 324) in both units (31, 32) are up-converted to the intermediate frequency by the mixer 1 (315-2, 325-2) and the filter 1 (315-3, 325-3). Because the IF synthesizers Tx LO1 (315-1, 325-1) in both units are frequency synchronized, the intermediate frequency (IF) signals at the output of the filter 1 (315-3, 325-3) are also frequency synchronized. The IF signals are amplified by the amplifier Amp 1 (315-5, 325-5) and up-converted to the radio frequency (RF) by the mixer 2 (315-6, 325-6) and the filter 2 (315-7, 325-7). As such, the radio frequency (RF) signals at the output of the filter 2 (315-7, 325-7) in both units are also frequency synchronized because the RF oscillators Tx LO2 (315-14, 325-14) are frequency synchronized. After the final amplification by the amplifier Amp 2 (315-8, 325-8), the RF signals are connected to the antenna coupling unit 33 via the two duplexers (316, 326).

In some embodiments, the two units (31, 32) achieve the phase synchronization by each unit having a phase control loop consisting of a downconverter including a mixer 3 (315-9, 325-9) and a filter 3 (315-10, 325-10), a phase detector (315-11, 325-11), an adder "Add" (315-12, 325-12), and a variable phase shifter (315-4, 325-4). In particular, the RF signals from the output of amplifier Amp 2 (315-8, 325-8) are down-converted to the intermediate frequency (IF), filtered and then fed into the phase detector (315-11, 325-11). The phase detector (315-11, 325-11) uses the reference frequency signal as a reference to detect a phase difference. From the phase detector (315-11, 325-11), the RF signals go to the adder block "Add" (315-12, 325-12) and are then used to control the variable phase shifter (315-4, 325-4). As such, the phase control loop keeps the phase of the RF signals constant relative to the phase of the reference signal. Because the phase control loops in both units use the same reference signal as a reference, the phase shift between the RF signals in the working and protection units (31, 32) is kept constant.

In some embodiments, the controllers (311, 321) add a fixed value to the output signal of the phase detectors (315-11, 325-11) via the adders (315-12, 325-12) so as to make the constant phase shift equal to 0 (zero). This fixed value is determined through calibration after the installation of the all outdoor radios system. One goal of the calibration is to get a maximum output power at the output of the ACU 33 while the transmitters in both radio units (31, 32) are online.

Figure 3B:
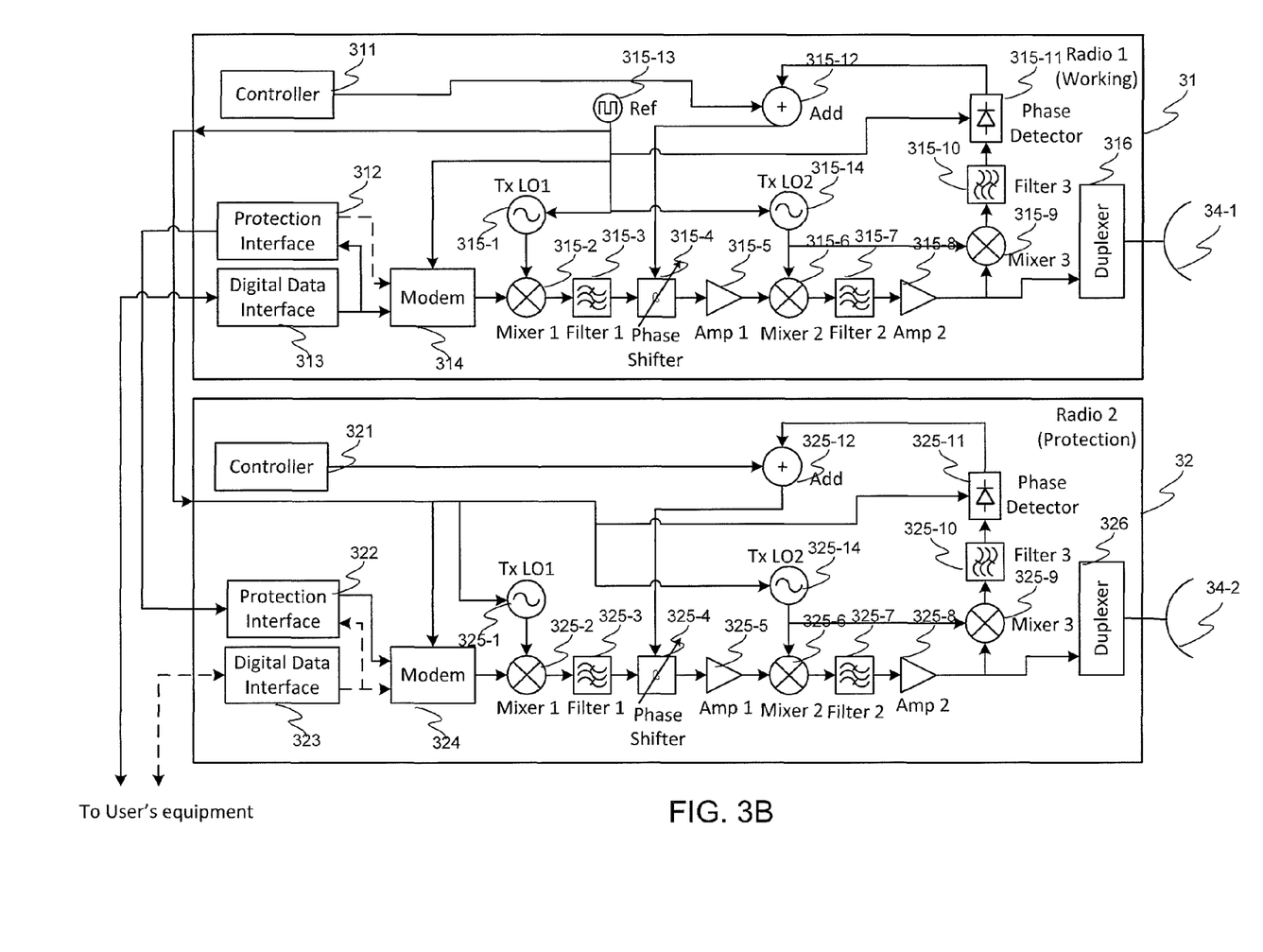

Note that FIG. 3A shows an embodiment in which the working and protection units (31, 32) are connected to the same antenna 34 through the ACU 33. But the proposed idea as described above also applies when the working and protection unit (31, 32) are connected to separate antennas. FIG. 3B is an exemplary illustration of another all outdoor radios system that is almost identical to the one shown in FIG. 3A except that the ACU 33 and the antenna 34 are replaced with two separate antennas 34-1 and 34-2, each coupled to one of the two radio units. Other than this structural difference, the all outdoor radios system shown in FIG. 3B is identical to the one shown in FIG. 3A.

Figure 4A:
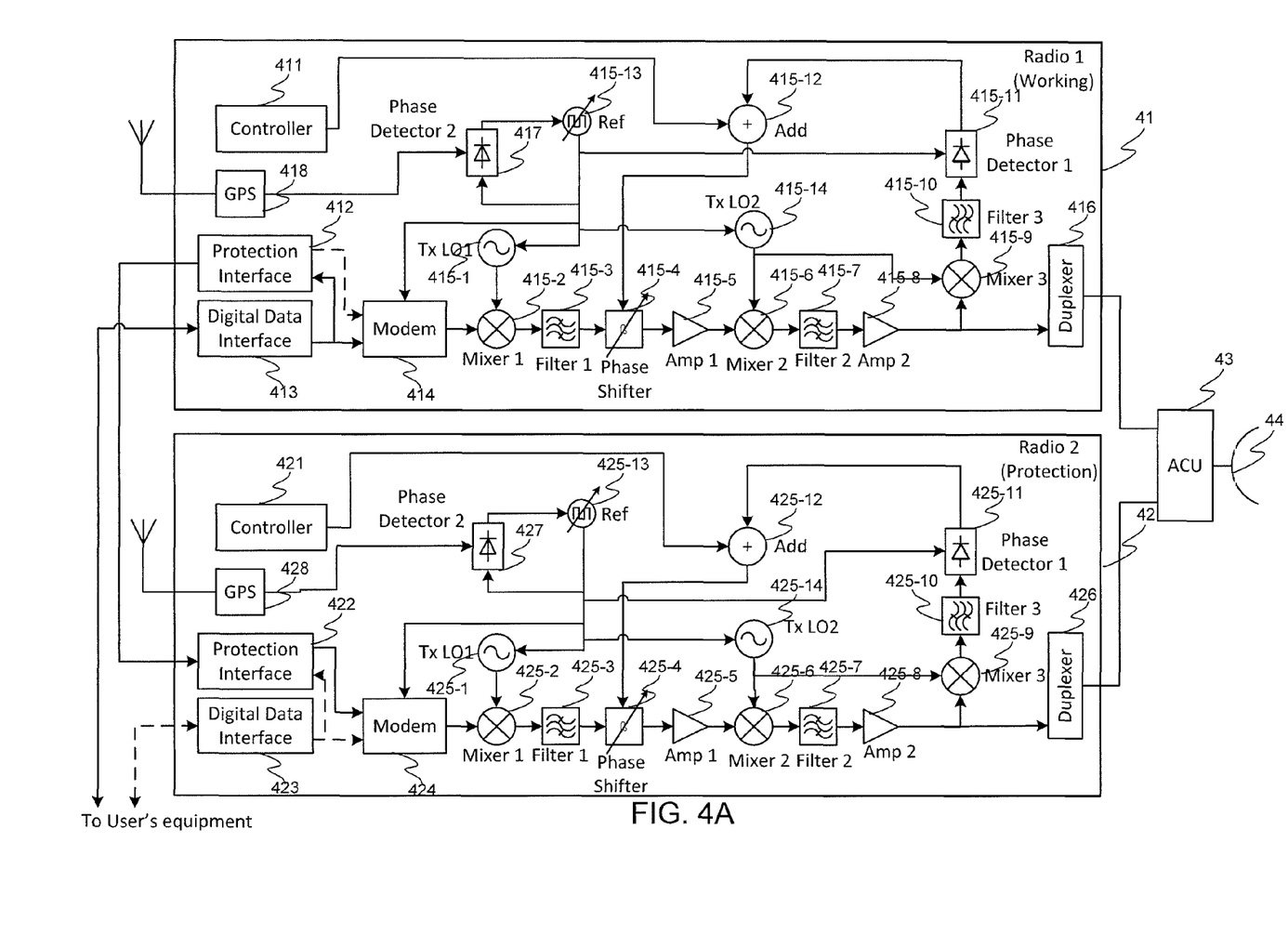
FIGS. 4A and 4B are exemplary illustrations of an all outdoor radios system using a GPS signal to synchronize the carrier signals between two radio units in accordance with some embodiments of the present invention.

FIG. 4A is an exemplary illustration of an all outdoor radios system using a GPS signal to synchronize the carrier signals between two radio units in accordance with some embodiments of the present invention. Note that the configuration of the all outdoor radios system shown in FIG. 4A is similar to that of FIG. 3A except that each radio unit shown in FIG. 4A is equipped with a Global Positioning System (GPS) receiver (418, 428), respectively, which uses a received GPS signal to synchronize the reference frequency oscillators in each unit without running the cable between units.

As shown in FIG. 4A, the GPS receiver (418, 428) receives a reference signal of precise frequency and phase from a satellite of the Global Positioning System. The signal is then used as a reference for the phase control loop consisting of the voltage controlled reference generator "Ref" (415-13, 425-13) and the phase detector 2 (417, 427). The phase control loop keeps the frequency and phase shift of the output signal of the reference oscillators (415-13, 425-13) constant relative to the GPS reference signal. Because the reference oscillators (415-13, 425-13) in both radio units (41, 42) use the same GPS reference signal as a reference, their frequency is the same and their phase shift is a constant value. Other than this structural difference, the all outdoor radios system shown in FIG. 4A is identical to the one shown in FIG. 3A.

Figure 4B:
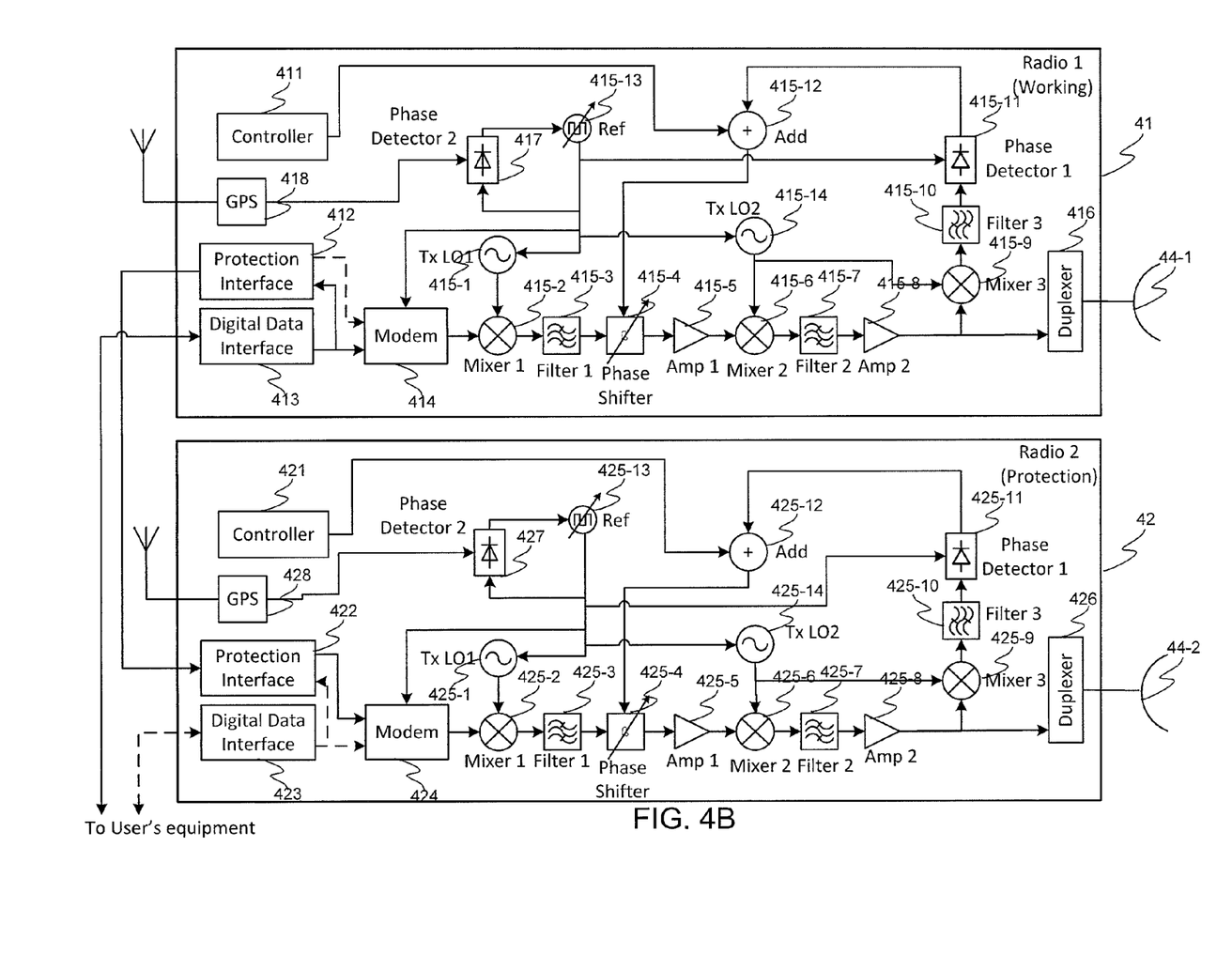

FIG. 4B is an exemplary illustration of another all outdoor radios system that is almost identical to the one shown in FIG. 4A except that the ACU 43 and the antenna 44 are replaced with two separate antennas 44-1 and 44-2, each coupled to one of the two radio units.

Figure 5:
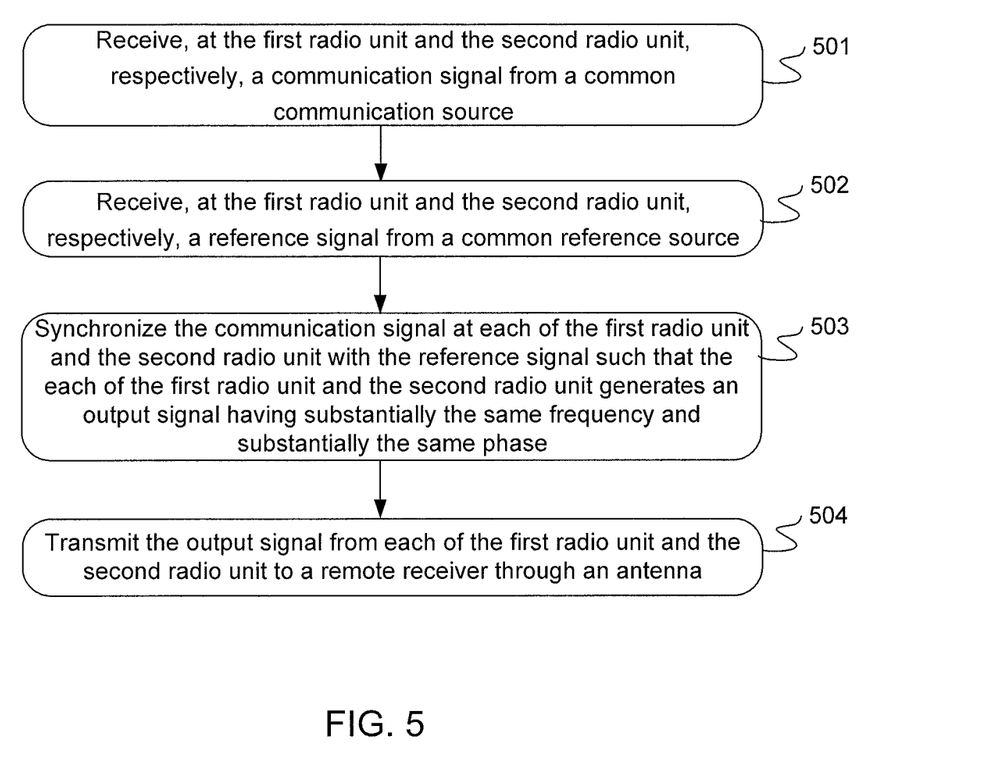
FIG. 5 illustrates an exemplary method performed by an all outdoor radios system for synchronizing two carrier signals going through two radio units in parallel in accordance with some embodiments of the present invention.

FIG. 5 illustrates an exemplary method performed by an all outdoor radios system for synchronizing two carrier signals going through two radio units in parallel in accordance with some embodiments of the present invention. The system receives (501), at the first radio unit and the second radio unit, respectively, a communication signal (e.g., customer data traffic) from a common communication source (e.g., the user's equipment). The system also receives (502), at the first radio unit and the second radio unit, respectively, a reference signal from a common reference source (e.g., a reference oscillator). The system synchronizes (503) the communication signal at each of the first radio unit and the second radio unit with the reference signal such that the each of the first radio unit and the second radio unit generates an output signal having substantially the same frequency and substantially the same phase. The system transmits (504) the output signal from each of the first radio unit and the second radio unit to a remote receiver through an antenna.

Figure 6A:
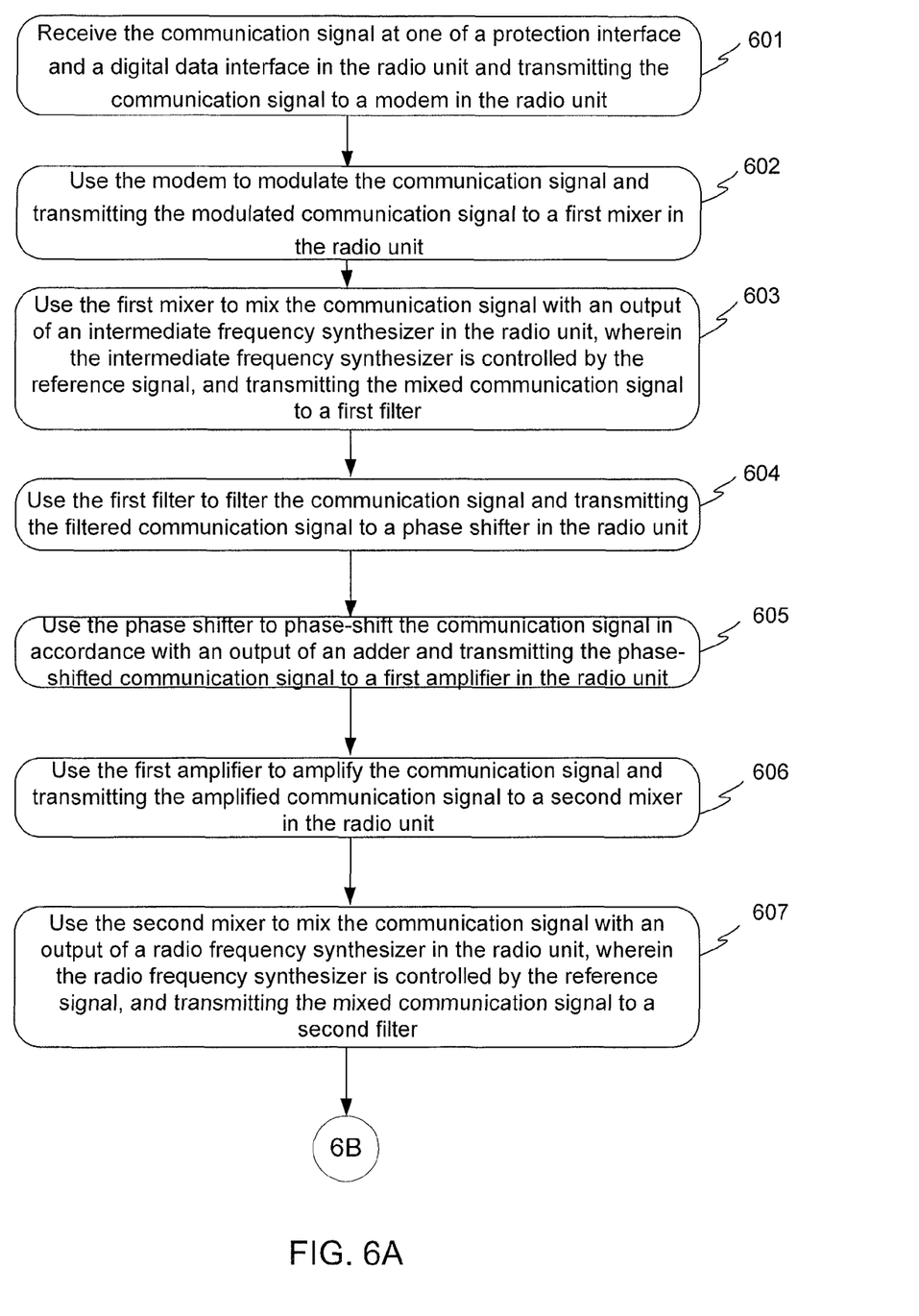
FIGS. 6A and 6B illustrate the more detailed operations of various components within the all outdoor radios system in accordance with some embodiments of the present invention.
Figure 6B:
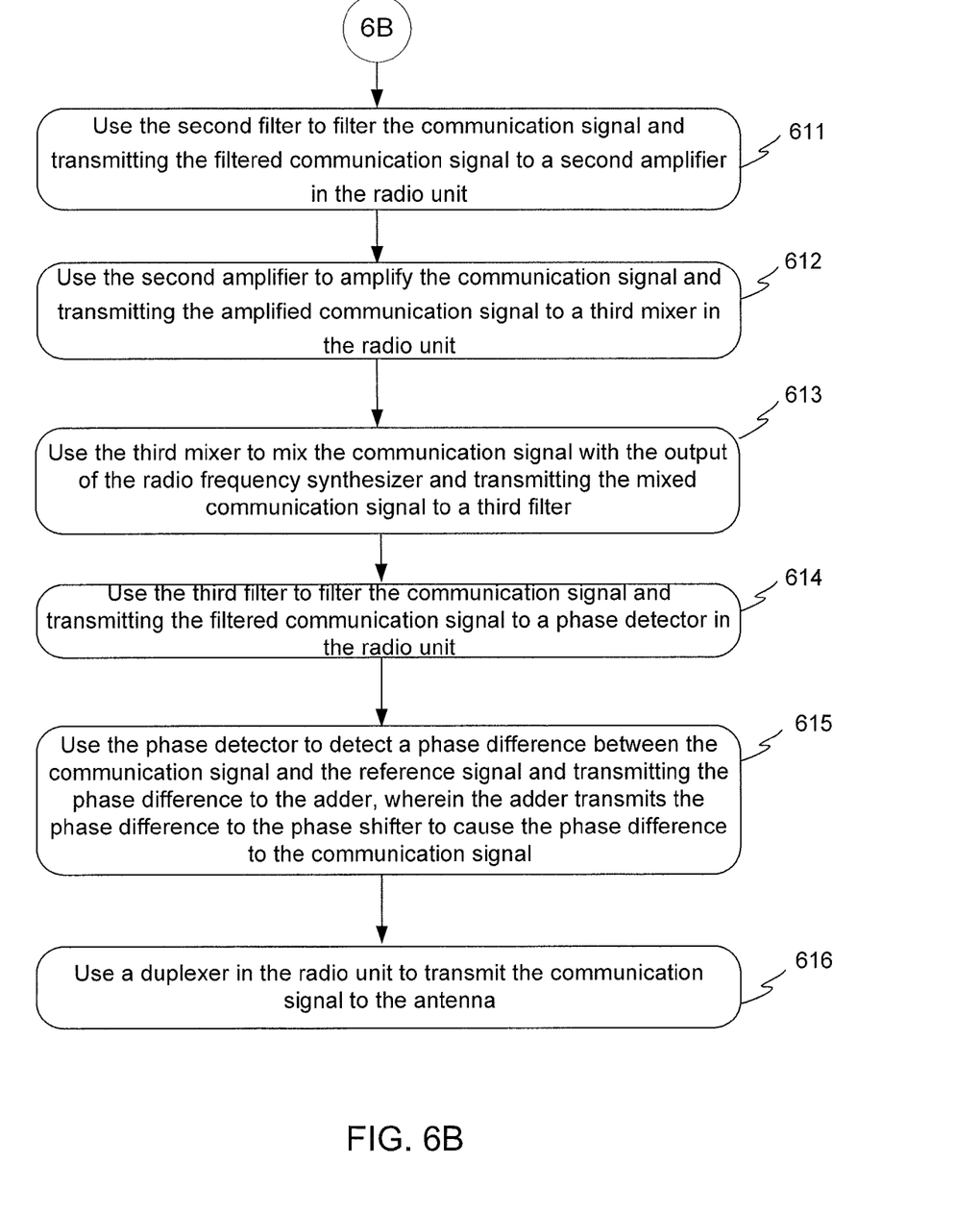

FIGS. 6A and 6B illustrate the more detailed operations of various components within the all outdoor radios system in accordance with some embodiments of the present invention. These operations apply to each of the first radio unit and the second radio unit within the all outdoor radios system. For simplicity, the first radio unit (e.g., the working radio unit 31) described above in connection with FIG. 3A is discussed below.

First, the first radio unit 31 receives (601) the communication signal at one of the protection interface 312 and the digital data interface 313 in the first radio unit and transmits the communication signal (e.g., the customer data traffic) to the modem 314 in the first radio unit. The modem 314 modulates (602) the communication signal and transmits the modulated communication signal to the first mixer 315-2 in the first radio unit.

The first mixer 315-2 mixes (603) the communication signal with the output of an intermediate frequency synthesizer 315-1 in the first radio unit and transmits the mixed communication signal to the first filter 315-3. In some embodiments, the intermediate frequency synthesizer 315-1 is controlled by the reference signal from the common reference source. The first filter 315-3 filters (604) the communication signal and transmits the filtered communication signal to the phase shifter 315-4 in the first radio unit. The phase shifter 315-4 applies (605) a phase-shift to the filtered communication signal in accordance with the output of the adder 315-12 and transmits the phase-shifted communication signal to the first amplifier 315-5 in the first radio unit.

The first amplifier 315-5 amplifies (606) the communication signal and transmits the amplified communication signal to the second mixer 315-6 in the first radio unit. The second mixer 315-6 mixes (607) the communication signal with the output of the radio frequency synthesizer 315-14 in the first radio unit and transmits the mixed communication signal to the second filter 315-7. The radio frequency synthesizer 315-14 is also controlled by the same reference signal.

The second filter 315-7 filters (611) the communication signal and transmits the filtered communication signal to the second amplifier 315-8 in the first radio unit. The second amplifier 315-8 amplifies (612) the communication signal and transmits the amplified communication signal to the third mixer 315-9 in the first radio unit. The third mixer 315-9 mixes (613) the communication signal with the output signal of the radio frequency synthesizer 315-14 and transmits the mixed communication signal to the third filter 315-10. The third filter 315-10 then filters (614) the communication signal and transmits the filtered communication signal to the phase detector 315-11 in the first radio unit. The phase detector 315-11 detects (615) a phase difference between the communication signal and the reference signal and transmits the phase difference to the adder 315-12. The adder 315-12 transmits the phase difference to the phase shifter 315-4 to cause the phase difference to the communication signal. Finally, the duplexer 316 in the first radio unit transmits (616) the communication signal to the antenna 34 via the ACU 33.

In some embodiments, the reference signal is generated by a reference oscillator located within one of the first radio unit and the second radio unit. In some other embodiments, the reference signal is synchronized with a GPS signal and the GPS signal is generated by a GPS satellite located remotely from the first radio unit and the second radio unit and received by a GPS receiver located within each of the first radio unit and the second radio unit.

In some embodiments, the power of the output signal from both the first radio unit and the second unit and transmitted through the antenna increases by 6 dB compared with the power of an output signal from only one of the first radio unit and the second radio unit. In some embodiments, the all outdoor radios system is free of traffic interruption in case of a transmission failure at one of the first radio unit and the second radio unit.

In sum, the coherent power combination scheme can replace the traditional transmitter protection approach of muting/un-muting the protection radio unit in an all outdoor radio system. The common reference source shared by the two units of an all outdoor radio system according to the present application is used for synchronizing the frequency and phase between the carrier signals in the two units. In some embodiments, the common reference source is a standalone reference source. In some other embodiments, the common reference source is controlled by a GPS signal captured by a GPS receiver. As such, the coherent power combination scheme can increase the output power of the all outdoor radios system by 6 dB using the same transmitters and without increasing the power consumption. In addition, the scheme eliminates the traffic interruption in case of one transmitter failure. If the GPS signal is used for synchronization, no extra outdoor rated cable is needed to run between the two radio units, resulting in not only the simplification of the radio installation and the reduction of radio installation and maintenance cost, but also more flexibility of radio installation.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A method of synchronizing a first radio unit with a second radio unit associated with an all outdoor radios system, the method comprising:

receiving, at the first radio unit and the second radio unit, respectively, a communication signal from a common communication source;

receiving, at the first radio unit and the second radio unit, respectively, a reference signal from a common reference source;

synchronizing the communication signal at each of the first radio unit and the second radio unit with the reference signal such that the first radio unit and the second radio unit generate two output signals having substantially the same frequency and substantially the same phase; and transmitting the two output signals from the first radio unit and the second radio unit to a remote receiver through an antenna, wherein synchronizing the communication signal at each of the first radio unit and the second radio unit with the reference signal further comprising:

at each of the first radio unit and the second radio unit:

receiving the communication signal at one of a protection interface and a digital data interface in the radio unit and transmitting the communication signal to a modem in the radio unit;

using the modem to modulate the communication signal and transmitting the modulated communication signal to a first mixer in the radio unit;

using the first mixer to mix the communication signal with an output of an intermediate frequency synthesizer in the radio unit, wherein the intermediate frequency synthesizer is controlled by the reference signal, and transmitting the mixed communication signal to a first filter;

using the first filter to filter the communication signal and transmitting the filtered communication signal to a phase shifter in the radio unit;

using the phase shifter to phase-shift the communication signal in accordance with an output of an adder and transmitting the phase-shifted communication signal to a first amplifier in the radio unit;

using the first amplifier to amplify the communication signal and transmitting the amplified communication signal to a second mixer in the radio unit;

using the second mixer to mix the communication signal with an output of a radio frequency synthesizer in the radio unit, wherein the radio frequency synthesizer is controlled by the reference signal, and transmitting the mixed communication signal to a second filter;

using the second filter to filter the communication signal and transmitting the filtered communication signal to a second amplifier in the radio unit;

using the second amplifier to amplify the communication signal and transmitting the amplified communication signal to a third mixer in the radio unit;

using the third mixer to mix the communication signal with an output of the radio frequency synthesizer and transmitting the mixed communication signal to a third filter;

using the third filter to filter the communication signal and transmitting the filtered communication signal to a phase detector in the radio unit;

using the phase detector to detect a phase difference between the communication signal and the reference signal and transmitting the phase difference to the adder, wherein the adder transmits the phase difference to the phase shifter to cause the phase difference to the communication signal; and using a duplexer in the radio unit to transmit the communication signal to the antenna.

2. The method of claim 1, wherein the reference signal is generated by a reference oscillator located within one of the first radio unit and the second radio unit.

3. The method of claim 1, wherein the reference signal is synchronized with a GPS signal, wherein the GPS signal is generated by a GPS satellite located remotely from the first radio unit and the second radio unit and received by a GPS receiver within each of the first radio unit and the second radio unit.

4. The method of claim 1, wherein the power of the output signal from both the first radio unit and the second unit and transmitted through the antenna increases by 6 dB compared with the power of an output signal from only one of the first radio unit and the second radio unit.

5. The method of claim 1, wherein the all outdoor radios system is free of traffic interruption in case of a transmission failure at one of the first radio unit and the second radio unit.

6. An all outdoor radios system, comprising:
an antenna coupling unit;
a first radio unit and a second radio unit, wherein both the first radio unit and the second radio unit are communicatively coupled to the antenna coupling unit and each of the first radio unit and the second radio unit is configured to receive an input signal from a common communication source and provide an output signal to the antenna coupling unit; and
a common reference source configured to generate a reference signal having a reference frequency and a reference phase,
wherein each of the first radio unit and the second radio unit further comprises:
a frequency synchronizer configured to synchronize the frequency of the input signal of the radio unit with the reference frequency of the reference signal; and
a phase synchronizer configured to synchronize the phase of the input signal of the radio unit with the reference phase of the reference signal,
such that the output signal of the first radio unit and the output signal of the second radio unit have substantially the same frequency and substantially the same phase when they reach the antenna coupling unit, wherein each of the first radio unit and the second radio unit further comprises:
a protection interface and a digital interface for receiving the input signal;
a modem for modulating an output from one of the protection interface and the digital interface and the reference signal;
a first mixer for mixing an output of the modem and an output of an intermediate frequency synthesizer, wherein the intermediate frequency synthesizer is controlled by the reference signal;
a first filter for filtering an output of the first mixer;
a phase shifter for phase-shifting an output of the first filter in accordance with an output of an adder;
a first amplifier for amplifying an output of the phase shifter;
a second mixer for mixing an output of the first amplifier and an output of a radio frequency synthesizer, wherein the radio frequency synthesizer is controlled by the reference signal;
a second filter for filtering an output of the second mixer;
a second amplifier for amplifying an output of the second filter;
a third mixer for mixing an output of the second amplifier and the output of the radio frequency synthesizer;
a third filter for filtering an output of the third mixer;
a phase detector for detecting a phase difference between an output of the third filter and the reference signal and transmitting the phase difference to the adder, wherein the adder is configured to cause a corresponding phase shift to the phase shifter under the control of a controller; and
a duplexer for receiving the output of the second amplifier and transmitting the output of the second amplifier to the antenna coupling unit.

7. The all outdoor radios system of claim 6, wherein the reference signal is generated by a reference oscillator located within one of the first radio unit and the second radio unit.

8. The all outdoor radios system of claim 7, wherein the reference signal is synchronized with a GPS signal, wherein the GPS signal is generated by a GPS satellite located remotely from the first radio unit and the second radio unit and received by a GPS receiver within each of the first radio unit and the second radio unit.

9. The all outdoor radios system of claim 6, wherein the power of the output signal from both the first radio unit and the second unit and transmitted through the antenna increases by 6 dB compared with the power of an output signal from only one of the first radio unit and the second radio unit.

10. The all outdoor radios system of claim 6, wherein the all outdoor radios system is free of traffic interruption in case of a transmission failure at one of the first radio unit and the second radio unit.

* * * * *